(12) United States Patent
Riley et al.

(10) Patent No.: US 9,225,745 B2
(45) Date of Patent: Dec. 29, 2015

(54) PROPOSAL SYSTEM ACCESS POLICY ENFORCEMENT

(71) Applicant: The One Page Company Inc., San Francisco, CA (US)

(72) Inventors: Patrick G. Riley, San Francisco, CA (US); Joanna R. Weidenmiller, San Francisco, CA (US); Stefan Proud, Sacramento, CA (US); John S. Bronson, San Francisco, CA (US); Stephane Come, Sacramento, CA (US)

(73) Assignee: The One Page Company Inc., San Francisco, CA (US)

( * ) Notice: Subject to any disclaimer, the term of this patent is extended or adjusted under 35 U.S.C. 154(b) by 164 days.

(21) Appl. No.: 13/915,768

(22) Filed: Jun. 12, 2013

(65) Prior Publication Data

US 2013/0340030 A1    Dec. 19, 2013

Related U.S. Application Data

(60) Provisional application No. 61/659,734, filed on Jun. 14, 2012.

(51) Int. Cl.
| | | |
|---|---|---|
| *H04L 29/06* | (2006.01) |
| *G06Q 10/10* | (2012.01) |
| *G06F 17/00* | (2006.01) |
| *H04L 9/32* | (2006.01) |

(52) U.S. Cl.
CPC .............. *H04L 63/20* (2013.01); *G06Q 10/105* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,356,909 B1 * | 3/2002 | Spencer | |
| 2008/0040173 A1 * | 2/2008 | Aleong et al. | 705/7 |
| 2008/0114628 A1 * | 5/2008 | Johnson et al. | 705/7 |
| 2009/0327729 A1 * | 12/2009 | Rhodes et al. | 713/171 |
| 2011/0209196 A1 * | 8/2011 | Kennedy | 726/1 |
| 2013/0226663 A1 * | 8/2013 | Jahid et al. | 705/7.32 |

* cited by examiner

*Primary Examiner* — Shin-Hon Chen
(74) *Attorney, Agent, or Firm* — Kwan & Olynick LLP

(57) ABSTRACT

Described herein are techniques and mechanisms for access policy creation and enforcement. According to various embodiments, a message may be received via a communications interface. The message may include a request to perform an action within a proposal system. The proposal system may be operable to create a request for proposals based on user input. The request for proposals may describe a business need associated with a business entity. The proposal system may be further operable to process a plurality of proposal documents received in response to the request for proposals. The request may be associated with a user account. A determination may be made as to whether the requested action complies with an access policy. The requested action may be performed when it is determined that the requested action complies with the access policy.

17 Claims, 10 Drawing Sheets

PROPOSAL SYSTEM ACCESS POLICY ENFORCEMENT

CROSS-REFERENCE TO RELATED APPLICATIONS

This application claims priority under 35 U.S.C §120 to Provisional U.S. Patent App. No. 61/659,734 by Riley et al., titled "Proposal System Access Policy Enforcement", filed Jun. 14, 2012, which is hereby incorporated by reference in its entirety and for all purposes.

TECHNICAL FIELD

The present disclosure relates generally to the field of personal and business planning and development services, and more specifically to access policy enforcement in the preparation of various types of proposals for action.

DESCRIPTION OF RELATED ART

Business plans and other types of project proposals are vital communication tools in the business world. Companies and individuals must be able to plan potential projects and subsequently communicate these plans in a clear and coherent manner to potential investors and partners. This is often done in the form of a written document outlining and detailing the key elements of the project.

Although clear communication is important, time is also often critical in making business decisions. A proposal or plan may be comprehensive, but too cumbersome and lengthy to read thoroughly. A person may not have time to digest all of the material. Key information can become lost in verbiage and overlooked. As a result, a proposal may be rejected not for failing to be a viable idea, but because it was not communicated efficiently enough.

Establishing a business relationship is often a time-consuming, inefficient, and imprecise process. For instance, employers and job applicants often find it difficult to clearly define and communicate the employment needs of the company and the capabilities and ideas of the job applicant. Such difficulties cause problems such as unnecessary unemployment and suboptimal matches between employer and job applicants. Likewise, both individuals and organizations seeking to engage in relationships such as contracts for procurement or service often find it difficult both to succinctly and plainly describe the needs and abilities of each party and to locate the best business partner for the relationship.

SUMMARY

Described herein are systems, devices, methods, and computer readable media that facilitate access policy creation and enforcement in the context of proposal systems. According to various embodiments, a message may be received via a communications interface. The message may include a request to perform an action within a proposal system. The proposal system may be operable to create a request for proposals based on user input. The request for proposals may describe a business need associated with a business entity. The proposal system may be further operable to process a plurality of proposal documents received in response to the request for proposals. The request may be associated with a user account. A determination may be made as to whether the requested action complies with an access policy. The requested action may be performed when it is determined that the requested action complies with the access policy.

According to various embodiments, the requested action may include a request to create a designated proposal document in response to the request for proposals. Performing the requested action may include creating the designated proposal document based on user input and suggested content. The suggested content may be determined by the proposal system. Creating the designated proposal document may include processing the user input and suggested content to arrange the proposal document on a single page. The requested action may be an action selected from the group consisting of: publishing a proposal document, evaluating a proposal document, and transmitting a proposal document to a designated recipient.

According to various embodiments, a designated organizational entity associated with the user account may be identified. The proposal system may be operable to provide proposal management services to a plurality of organizational entities including the designated organizational entity. The access policy may be associated with the designated organizational entity.

According to various embodiments, the user account may be a member of first and/or second user account groups. The access policy may identify a first one or more permitted actions associated with the first user account group and/or a second one or more permitted actions associated with the second user account group. Determining whether the requested action complies with the access policy may include determining whether the first or second one or more permitted actions includes the requested action. The requested action may be performed when either the first or second one or more permitted actions includes the requested action.

According to various embodiments, the user account may be associated with a first organizational role. The access policy may identify one or more permitted actions for the first organizational role. Determining whether the requested action complies with the access policy may include determining whether the one or more permitted actions includes the requested action. The first organizational role may be associated with relationship information. The relationship information may designate a relationship between the first organizational role and a second organizational role. A designated one of the one or more permitted actions may be inherited from access policy information associated with the second organizational role.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
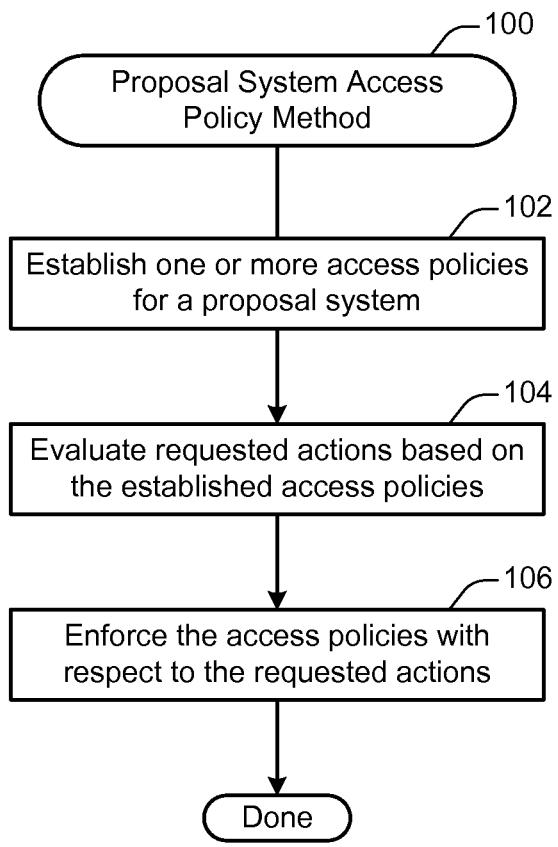
FIG. 1 illustrates an example of a method for facilitating access to a proposal system based on an access policy in accordance with techniques and mechanisms described herein.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, some of the techniques of the present invention will be described in the context of proposal documents, such as proposal documents related to employment opportunities. However, it should be noted that the techniques of the present invention apply to a wide variety of different documents and communications. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the creation and publishing of requests for proposals (RFPs) by users acting as individuals or representing organizations. The RFPs may then be published and viewed by or transmitted to interested recipients. The recipients may then create proposals in response to the RFPs. A proposal system for facilitating the creation of RFPs and proposals generated in response to RFPs may facilitate various types of business transactions.

According to various embodiments, a proposal system may provide a platform for companies to publish RFPs for open positions or projects to be filled. The proposal system may provide a platform for job seekers to create and submit proposals or ideas in response to open RFPs. The proposal system may facilitate the gathering of statistics and analytics, such as information related to employment or company performance. The proposal system may facilitate the development of new techniques for matching business partners with each other, employees with employers, and problems with solutions.

Example Embodiments

According to various embodiments, access to a proposal system may be controlled by various types of access policies. An access policy may be used to designate a particular set of actions that may be performed by a particular user. An action may be any one of various types of operations that may be performed via the proposal system. These types of operations may include, but are not limited to: creating, editing, commenting on, reviewing, approving, evaluating, publishing, or transmitting proposals or RPS.

In various instances, users may wish to provide others with access to their proposals or RFPs. For instance, a user creating a proposal for an employment opportunity may wish to have friends and colleagues edit or provide comments on the proposal. The user may wish to assign different levels of permissions to different individuals. For example, the user may wish to provide access to many of the user's contacts in order to receive as much input as possible. However, the user may wish to restrict permission to edit a proposal to a limited set of individuals.

In various instances, organizations may wish to provide members of the organization with access to the organization's proposals and RFPs. For example, an RFP generated to fill an employment opportunity for the sales department in a company may be created by a human resources manager. However, another user such as a sales director may have permission to view the RFP and to provide comments. At the same time, the HR manager's supervisor may have permission to edit and approve the RFP. In some cases, permissions may be based on a hierarchical organizational structure. For instance, a supervisor may have at least the same permissions as any individual supervised by the supervisor.

According to various embodiments, various types of access policies may be supported. For example, an access policy may be created based on an organizational environment. In an organizational environment, a user may have access permissions that are based on the user's organizational roles, the user's relationships to other users within the organization, or other organizational information. As another example, an access policy may be created on a personal basis. To create a personal access policy, a user may create groups to organize the user's contacts. Then, the groups may be assigned access permissions for accessing proposals or RFPs created by the user.

According to various embodiments, an access policy may be enforced when a user attempts to take an action within the proposal system. When a user requests to view a list of proposals, for instance, the proposals shown on the list may be limited to only those proposals that the user has permission to access. Then, when a user requests to perform an action such as edit or comment on an RFP or a proposal, the requested action will be evaluated based on the access policies with which the user is associated. If the requested action is allowed under at least one of the access policies, then the action may be performed.

According to various embodiments, authoring and submitting a proposal for employment may offer various advantages to job applicants in comparison with sending a traditional resume. For example, a proposal may allow a job applicant to present a compelling case for a company to hire the applicant. The proposal may be used to show the prospective employer exactly how the applicant will make the company better and more successful. By presenting the applicant in a way that an ordinary resume can't accomplish, a proposal may significantly increase the applicant's chances of landing a job. Creating a proposal may also help give the applicant helpful insights into the applicant's unique personal qualities and life experiences, which may help the applicant better stand out as a job candidate.

According to various embodiments, authoring an RFP and receiving proposals for employment may offer various advantages to organizations in comparison with traditional postings on job boards or other mechanisms and techniques to alerting prospective job applicants to employment opportunities. Traditional recruitment typically involves resumes. While resumes often provide information regarding personal data and a candidate's experience and knowledge, resumes typically provide little detail regarding the candidate's mindset and attitude. In contrast to resumes, proposals created in accordance with the techniques described herein may be used to evaluate a candidate's abilities in comprehension, analysis, synthesis, and evaluation. In order to solicit proposals, a company may create a request for proposals that describe the challenges and needs facing the organization. Then, the company will receive a proposal from each job applicant that describes exactly how that job applicant plans to solve the challenges and fulfill the needs described in the RFP.

According to various embodiments, a proposal may include designated content sections, which may appear in a designated order. For example, a proposal may include Title and/or Subtitle sections that define the proposal, Target and/or Secondary Target sections that identify the goals of the proposal, a Rationale section that lays out the basic reasons why the action is necessary, a Financial section that describes the financial aspects of the deal, a Status section that describes a current state of affairs, and/or an Action section that indicates exactly what the proposer wants the recipient to do.

In some cases, the discussion of embodiments herein refers to proposals and RFPs authored and processed for the purposes of connecting job applicants with potential employers. However, according to various embodiments, the techniques and mechanisms discussed herein may be used to facilitate a wide variety of business transactions and relationships. These transactions and relationships may include, but are not limited to, employment opportunities, procurement contracts, service agreements, consulting arrangements, and legal representation.

According to various embodiments, a proposal and/or an RFP may be created in accordance with a designated format. In particular embodiments, the format may limit both each proposal and each RFP to a single page. Accordingly, some embodiments discussed herein and illustrated in the drawings may refer to a one page proposal. However, various types of formats and restrictions on proposals and RFPs may be used. For example, proposals and/or RFPs may be limited to a different length. As another example, proposals and/or RFPs may be created in accordance with restrictions on the type and order of content included in each document. As yet another example, in some embodiments formatting characteristics such as content or length may serve as guidelines rather than strict limits. In some embodiments, the types of formats and restrictions used may be strategically determined based on factors such as the type of information conveyed by the communications and the type of industry in which the communications are conducted.

According to various embodiments, the infrastructure for providing a proposal system may be configured in various ways. In particular embodiments, the infrastructure may be provided via a cloud computing framework. In a cloud computing framework, hardware and basic software such as web server software may be provided in a scalable, on-demand fashion by a third-party, while the service provider of the proposal system provides the application logic and other high-level functionality for generating the proposal system. Alternately, the infrastructure may be provided via a more conventional computing framework, for example a computing framework in which the hardware and/or basic software for providing access to the system is controlled by the service provider of the proposal system.

FIG. 1 illustrates an example of a method 100 for facilitating access to a proposal system based on an access policy in accordance with techniques and mechanisms described herein. According to various embodiments, the method may be performed at a computing device configured to provide users with access to a proposal system. For instance, the method may be performed at a computing device discussed with respect to FIG. 2-3 or 7-10.

At 102, one or more access policies are established for a proposal system. According to various embodiments, each access policy may designate a particular action or set of actions that the user may perform. For example, an access policy may indicate that a particular user is permitted to edit a particular proposal. As another example, an access policy may indicate that a particular user is permitted to approve and publish a particular type of RFP within an organization.

According to various embodiments, a user may be associated with various types of access policies. For example, a user may receive permission to perform an action relating to a proposal or an RFP because the user has been granted the permission by the creator of the proposal or the RFP. As another example, the user may receive permission to perform an action based on the user's membership in an organization coupled with an organizational role or relationship within that organization. The creation of access policies is discussed in greater detail elsewhere in this application, for example with respect to FIGS. 4 and 5.

At 104, requested actions within the proposal system are evaluated with respect to the established access policy. According to various embodiments, a user may be permitted to perform any action that is allowed under any access policy with which the user is associated. For instance, a user may be a member of an organization that is associated with an organizational access policy that grants the user some access permissions. The same user may be granted other access permissions by personal access policies, such as personal access policies associated with the user's professional contacts. If the user requests to perform an action that is permitted under either the organizational or personal access policies, then the requested action can be performed.

At 106, the policy is enforced with respect to the requested actions. When an action is permitted by the access policy, the system may attempt to perform the requested action. When an action is not permitted by the access policy, the system may deny the request. In particular embodiments, when a request is denied, a message may be transmitted to the requester indicating the denial. Alternately, or additionally, an error message may be stored in a log, sent to an administrator, or otherwise processed. The evaluation of requested actions based on access policies and the enforcement of the access policies with respect to the requested actions is discussed in further detail elsewhere in this application, for example with respect to FIG. 6.

Figure 2:
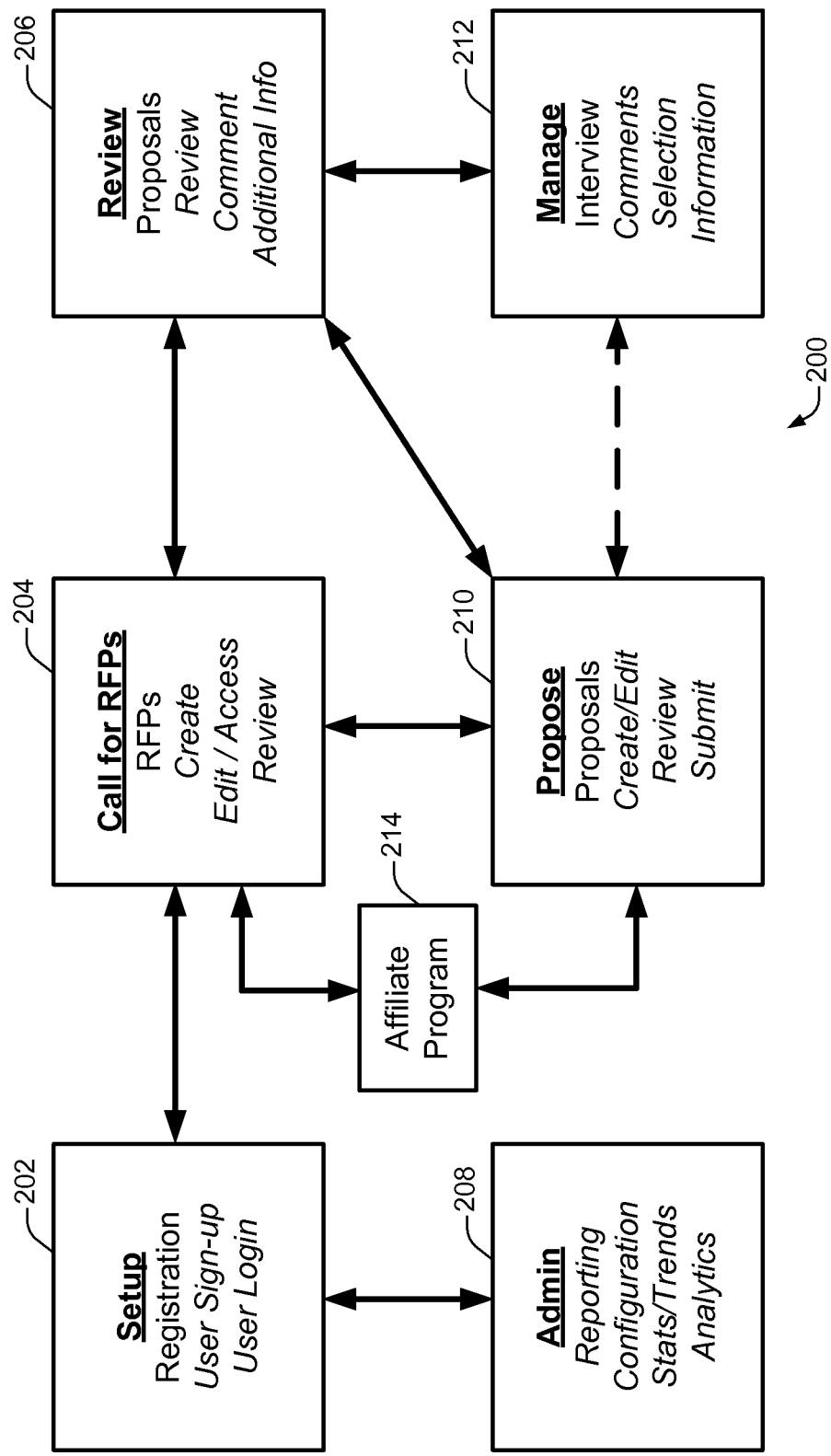
FIGS. 2 and 3 illustrate examples of a system that may be used in accordance with techniques and mechanisms described herein.

FIG. 2 shows a system 200 that may be used in accordance with techniques and mechanisms described herein. According to various embodiments, the system 200 may be used to generate, respond to, evaluate, transmit, receive, and administer proposals and requests for proposals (RFPs). The system 200 includes various modules for performing operations related to proposal generation and processing. These modules may be implemented on various computing devices in communication via a network. In particular embodiments, some modules may be implemented on the same computing device. Alternately, a module may be spread across more than one computing device.

The system 200 includes a setup module 202, an administration module 208, an RFP generation module 204, an RFP review module 206, a proposal generation module 210, a management module 212, and an affiliate program module 214. In some embodiments, a proposal system may include operations not shown in FIG. 2. Alternately, a proposal system may not include one or more of the modules shown in FIG. 2.

At 202, the setup module is shown. According to various embodiments, the setup module may facilitate the registration process for new users of the proposal system. The new users may be individuals, companies, or individuals working on behalf of companies. The new users may be creating RFPs, responding with proposals, or both.

According to various embodiments, the setup module 202 may also facilitate the login process for users who already have accounts. In order to log in to the proposal system 200, a user may need to provide identification information. The specific identification required may be strategically determined based on factors such as the degree of security desired, the capabilities of the client device from which the user is logging in, and the degree of convenience for the user. The type of information that may be requested from the user may include, but is not limited to: a user name, a password, a pass phrase, a personal identification number (PIN), a cryptographic certificate, or biometric information such as a fingerprint.

In some embodiments, the setup module may facilitate the registration process for new users by allowing users to log in through a third party account. For instance, a user may log in to a third party system such as LinkedIn, Facebook, or Gmail. Then, the third party service may transmit identification information for the user directly to the proposal system, for instance at the user's request. The transmitted identification information may be used to identify a previously created user account or may be used to register a new account within the proposal system. In particular embodiments, a user account within the proposal system and a user account within a third party system such as LinkedIn may be linked so that proposal-related actions may be integrated across the different systems.

According to various embodiments, user accounts may provide various features to users of the proposal system. For example, a user account may be associated with a profile that includes the user's email address and biographic data. A user account may be associated with a notification log that identifies notification messages by or to the user such as emails, Twitter messages (tweets), text messages, and messages sent via the proposal system. A user account may allow the display of a user interface for displaying activity metrics such as a number of proposals created, a number of responses created, a number of views, and a number of jobs trending. A user account may be associated with a number of social media handles, such as Facebook, Twitter, and LinkedIn accounts. In particular embodiments, associating the accounts in this way may allow the user to publish proposals, requests for proposals, activity logs, and other status updates to the activity feeds of any one of the user's social networks, such as LinkedIn, Facebook, or Twitter. A user account may be associated with one or more groups of users or organization accounts.

At 204, an RFP generation module is shown. According to various embodiments, the RFP generation module may facilitate the creation, editing, and review of requests for proposals. Each request for proposal may be any request to receive proposed solutions to a problem facing an individual, company, or other entity. For example, an RFP may be a request to receive proposals for fulfilling an employment opportunity. As another example, an RFP may be a request to receive proposals for a service contract for a company. Using the RFP generation module 204, a user may create a new RFP, edit or view an existing RFP, or provide comments or otherwise review an RFP.

According to various embodiments, the RFP generation module 204 may include various components. For example, the RFP generation module may include a user interface component configured to receive information such as content to include in an RFP, formatting options for formatting an RFP, access policy options specifying access information such as who may view or edit an RFP, and other such information. As another example, the RFP generation module 204 may include a data management component for storing the data that makes up an RFP. As yet another example the RFP generation module 204 may include an RFP generation assistance component operable to help users create an RFP in a standardized, easily readable format. For instance, the RFP generation assistance component may analyze user input to help the user create an RFP with clear, readable prose constructed using well-understood terms and phrases. Also, the RFP generation assistance component may analyze the formatting of the RFP to help the user create a proposal that follows a standardized ordering or fits within a size or length constraint.

According to various embodiments, the RFP generation system may provide a user interface for accessing various types of features. For example, a user dashboard may list RFPs created and published by the user. Each RFP may be associated with information such as a description, a number of views, and a number of responses. In particular embodiments, the information presented in the user dashboard may be selected based on various types of user characteristics, such as a user's identity, access level, or organizational role.

According to various embodiments, an RFP upload interface may allow the uploading of an RFP or other content in a PDF or other document format. In particular embodiments, an RFP field generator may populate user information fields with biographical information or other data collected from uploaded documents in a PDF or other document format. For instance, the proposal system may scan or process the document in order to retrieve various types of information.

According to various embodiments, a proposal replies log may provide a list for displaying and reviewing proposals submitted in response to an RFP. Users may comment on each proposal publicly, privately, or semi-privately. A log may provide an interface to request, enter, and view RFP or proposal comments, interview feedback, proposal scores, and other types of information. A log may be presented as part of the user interface in the form of a dashboard displaying statistics concerning the RFP.

According to various embodiments, an RFP generation system may include one or more RFP tracking components. RFP tracking may include one or more user interfaces for displaying and reviewing different stages of the proposal generation, application, and review process. For instance, RFP tracking may include a user interface to view workflow status associated with an RFP. For example, a workflow status may indicate timing information such as a creation date, a period of time the RFP has been open, or a period of time remaining before the RFP is closed. As another example, a workflow status may indicate approval information such as whether an RFP has been approved or rejected, is pending review, or has been flagged as requiring revisions. As yet another example, a workflow status may indicate budgetary information such as whether the RFP has been budgeted, what budget has been allocated for the RFP, and in what time period the budgetary approval applies.

A proposal creator may include an interface such as one or more forms or wizards to help the user create, edit, review, and publish an RFP. An archiving interface may provide the ability to archive RFPs, proposals, and other documents. An interview manager may provide an interface to manage interviews, comments, proposal scores, and other such information. An interview invitation interface may provide the ability for a user viewing a proposal to send an invitation to the proposal creator or another individual to participate in an interview regarding the proposal. A proposal match interface may allow a user to select and display proposals matching criteria such as content criteria and scoring criteria.

At 206, a proposal review module is shown. According to various embodiments, the proposal review module may facilitate the review of proposals and/or RFPs. Reviewing a proposal or RFP may include viewing the proposal or RFP, providing comments regarding the proposal or RFP, or providing additional information for including with the proposal or RFP. In some instances, access to a proposal or RFP may be limited by an access policy, which may specify users or organizations who may take various actions related to a proposal or RFP.

In one example, a user may be a member of a company responsible for hiring a new employee. The user may then create a request for proposals for prospective applicants to describe how they would perform in the role of the new employee. In order to ensure that the RFP accurately describes the challenges that the company faces that led to the need to hire a new employee, the RFP may be reviewed by other individuals, such as the user's supervisor or a human resources manager at the company. These individuals may provide comments, suggest additional information for including in the RFP, or edit the RFP directly.

According to various embodiments, the proposal review module may facilitate the review of proposals provided in response to an RFP. For example, a prospective employee may create a proposal to fill an employment role at a company. Then, the prospective employee's friends or colleagues may be invited to critique the proposal before the prospective employee submits it. As another example, the author of an RFP may review proposals created in response to the RFP. When the author identifies suitable proposals, the author could initiate communications with the proposer or refer the proposal for further processing, such as an interview for a job candidate.

At 210, a proposal generation module is shown. According to various embodiments, the proposal generation module may facilitate the generation of proposals in response to an RFP created via the RFP generation module 204. The proposal generation module may allow a user to create a new proposal, edit an existing proposal, review or comment on a proposal, or submit a proposal to the creator of an RFP. As discussed with respect to the RFP generation module 204, the proposal generation module 210 may have various components, such as a user interface component, a data management component, or a proposal generation assistance component.

In some embodiments, the proposal generation module may be associated with a proposal tracking system configured to present various types of information related to a generated proposal. For example, the proposal tracking system may present information such as whether a proposal has been accepted or rejected, has been flagged as needing revisions, or is pending review. As another example, the proposal tracking system may indicate status information associated with a job-seeking candidate such as "rejected," "hired," "first phone screen", or "first onsite interview," or "in need of additional documentation or work samples."

At 212, a proposal management module is shown. According to various embodiments, the proposal management module may facilitate the processing of proposals created via the proposal generation module 210. Processing may involve operations related to sorting, selecting, evaluating, and/or commenting on proposals.

For example, an RFP for an employment opportunity at a company may result in hundreds or thousands of proposals. In this case, an automated process associated with the management module 212 may be used to identify the most promising proposals. Then, those proposals may be further ranked or sorted by users, such as hiring managers at the company who access the proposals via the management module 212, to select a limited number of candidates for interviewing. Finally, the candidates selected for interviewing may be provided with a standardized interview process involving the management module 212 to reduce bias in the hiring process and to help identify the best candidate.

As another example, an RFP for a service contract may also generate many different proposals. These proposals may include a variety of information, such as proposed service contract terms. The management module 212 may be used to aggregate, sort, and analyze this information so that the proposed service contracts may be more easily compared. Next, the management module 212 may be used to identify proposals that meet designated criteria. Then, proposals that meet the designated criteria may be reviewed by individuals, who may work together to select a proposal for adoption.

At 208, the administration module is shown. According to various embodiments, the administration module may facilitate operations, which may include, but are not limited to: reporting, configuration, data analysis, and the determination of statistics or trends related to data accessible via the system. For example, the administration module may be used to create reports on how many RFPs or proposals have been created, which organizations are associated with the creation of RFPs or responses to RFPs, and who should be billed for services provided via the proposal system. As another example, the administration module may be used to configure the proposal system, such as establishing parameter values for logging into the system, registering new user accounts, creating RFPs, creating proposals, reviewing proposals, and managing proposals. As yet another example, the administration module may be used to analyze data accessible via the proposal system. For instance, the administration module may be used to identify trends in hiring by companies, statistics describing the types of jobs being created, or analysis of the types of problems facing companies.

According to various embodiments, the administration module may facilitate reporting and data analysis specific to an RFP or users associated with an RFP or open job position. For instance, a report may be generated regarding the demographic characteristics of applicants responding to a particular job posting. In some cases, companies may need to report on demographic data voluntarily submitted by applicants such as information regarding gender, race, veteran status, and disability status.

In some embodiments, a report may be generated regarding the activity log of users in the RFP process in order to track data such as time-to-hire, number of interviews scheduled, number of applicants, number of positions open by hiring manager, number of positions budgeted per quarter, and remaining open headcount. For example, the proposal system may track (e.g., for performance monitoring purposes) the activity log of recruiters or hiring managers. As another example, the proposal system may track the number of open positions per financial quarter, for instance for financial planning and forecasting purposes.

At 214, the affiliate program module is shown. According to various embodiments, the affiliate program module may be used to allow third party software or services to interact with the proposal system. For example, a company may wish to generate or receive RFPs and/or proposals in a specialized format or with specialized branding. In this case, an affiliate program or service may be employed to facilitate the production of the RFPs and/or proposals. As another example, a third party system may be used to distribute or promote an RFP, such as on an external social network.

According to various embodiments, the affiliate program module 214 may communicate with the rest of the system in various ways. In particular embodiments, the affiliate program module 214 may include a communication interface or API. In this case, the third party software or services may be located on remote systems and communicate with the proposal system via a network. Alternately, some or all of the third party software or services may be located on computing devices associated with the proposal system 200. In this case, the affiliate program module 214 may include one or more computing devices, such as application servers, under the control of the entity providing the proposal system.

Figure 3:
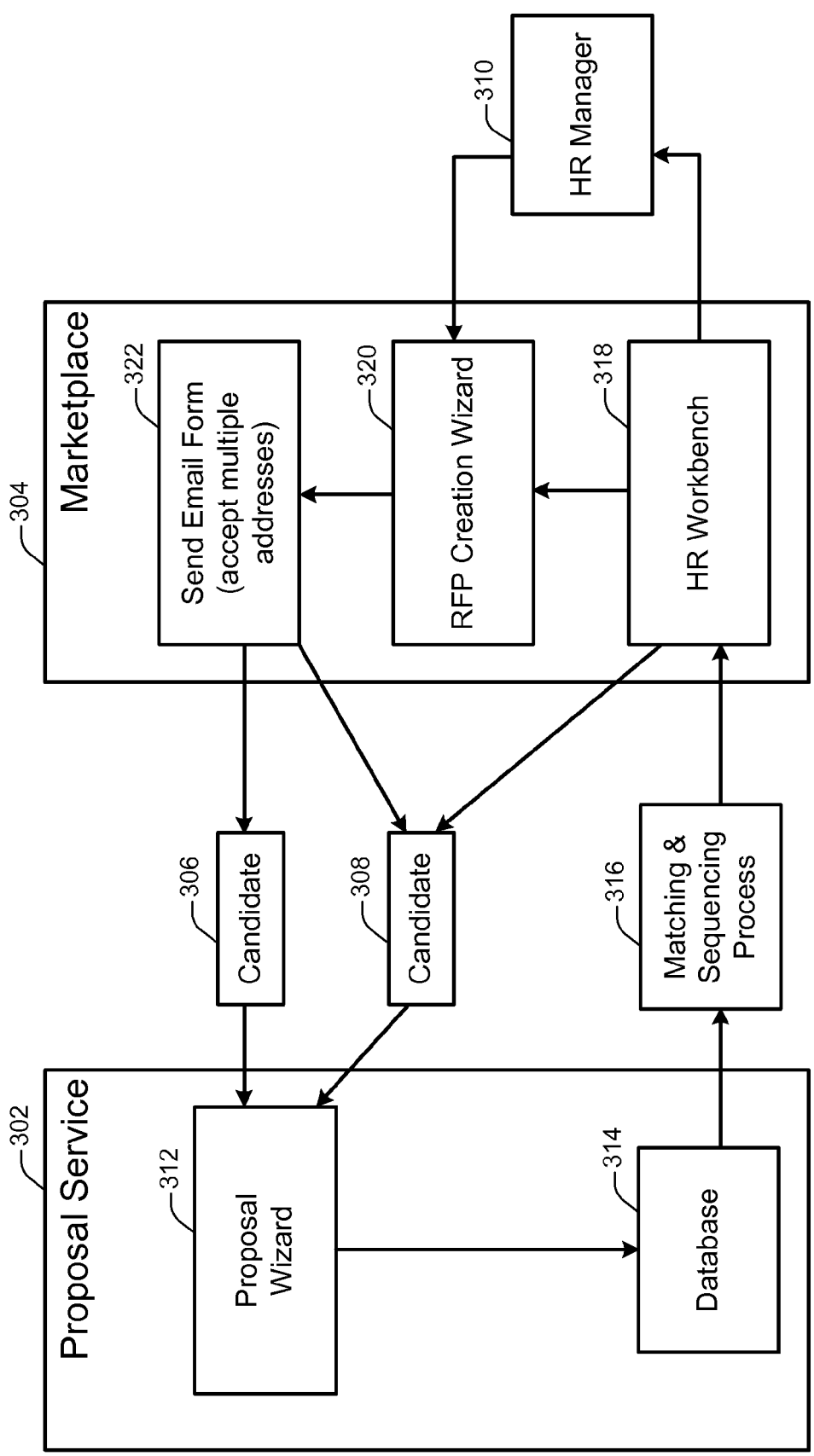

FIG. 3 shows a system 300 that may be used in accordance with techniques and mechanisms described herein. According to various embodiments, the system 300 may be used to create and respond to RFPs in the employment context. That is, the system 300 may facilitate the creation of requests for and responses to proposals to fulfill an employment need for a company.

The system 300 includes an applicant service provider (also referred to herein as a proposal service) 302 and a marketplace 304. The applicant service provider 302 includes modules operable to provide services to job applicants, such as a proposal creation wizard 312 and a storage system 314 such as a database. The marketplace 304 includes modules operable to provide services to companies, such as a human resources workbench module 318, an RFP creation wizard module 320, and a communication module 322. A proposal analysis module 316 may facilitate the transmission of information between the applicant service provider 302 and the marketplace 304. Various users, such as the job candidates 306 and 308 and the human resources manager 310 may interact with the system 300.

According to various embodiments, the marketplace 304 may allow users such as HR managers to create RFPs, to send RFPs to users, and to review proposals generated in response to RFPs. At 310, a human resources manager is shown interacting with the marketplace 304. The human resources manager may create an RFP via the RFP creation wizard 320. The RFP creation wizard 320 may be substantially similar to the RFP generation module 204 discussed with respect to FIG. 2.

According to various embodiments, when an RFP is created via the RFP creation wizard 320, one or more users may be invited to respond to the RFP via the communications module 322. The communications module 322 may facilitate the transmission of the RFP via various communications mediums. For instance, an invitation to respond to an RFP may be transmitted via email, instant message, text message, or communication via a social network such as LinkedIn, Twitter, or Facebook. As another example, an invitation to respond to an RFP or job posting may be posted to the company's or hiring manager's associated social network activity feed such as, but not limited to, a LinkedIn page, a Facebook page, or a Twitter account.

In particular embodiments, a user such as the human resources manager 310 may identify one or more recipients of the RFP via a list or other selection mechanism. Alternately, or additionally, the communications module 322 may assist the user in identifying recipients. For example, the communications module 322 may help the human resources manager 310 identify users of the proposal system who may be well-suited to submit a proposal in response to the RFP. As another example, the communications module 322 may identify recipients who have been sent similar proposals in the past or who have otherwise been previously designated for receiving such RFPs.

In the example shown in FIG. 3, the HR manager provides a list of e-mails to the communications module 322. Then, the communications module sends a message via e-mail to the job seekers 306 and 308. The message invites both candidates to submit a proposal in response to the RFP. The candidates 306 and 308 may create and submit such a proposal via the applicant service provider 302.

According to various embodiments, the applicant service provider may provide a number of business functions with accompanying user interfaces for job applicants to perform various operations. For example, the applicant service provider may provide a user dashboard that lists proposals created and submitted along with information such as a description of each proposal and a number of user views of each proposal. As another example, the applicant service provider may provide a proposal creator, which may include an interface containing one or more forms or guides to help the user create, edit, review, and publish a proposal. As yet another example, the service provider may provide a proposal replies log, which may allow users to list and review submitted proposals as well as to privately and/or publically comment on each proposal. As still another example, the service provider may provide an RFP browser that allows users to search, browse, and filter RFPs to identify open RFPs to which to respond.

According to various embodiments, the applicant service provider 302 is operable to provide various services to job seekers, such as the candidates 306 and 308. For example, a user may be able to view the number of recruiters who have viewed the applicant's proposals, a list of open RFPs in response to which the user is creating proposals, a list of comments that have been provided regarding the user's proposals, suggested edits to the user's proposals, and other such information. As another example, a user may be able to see a list of popular proposals or new features.

According to various embodiments, the proposal creation wizard 312 may be used to help create an appropriate response to the RFP. For example, the proposal creation wizard 312 may assist users in creating a proposal that includes content responsive to the RFP. As another example, the proposal creation wizard 312 may assist users in creating a proposal in accordance with a standardized format, such as content arranged in a particular order and/or content limited to a single page. The particular format and content associated with the proposal may be strategically determined based on factors such as the industry for which the proposal is created, the company to which the candidates are applying, the RFP to which the candidates are responding, and the type of information that is intended to be included in the proposal. The proposal creation wizard 312 may be in at least some respects substantially similar to the proposal generation module 210 discussed with respect to FIG. 2.

According to various embodiments, information received via the proposal wizard 312 may be stored in the storage module 314. The storage module 314 may include one or more databases, such as an Oracle database or a SQL database. The storage module may include various types of databases, such as a flat file database, a relational database, a cloud database, an active database, a distributed database, or any other type of database.

According to various embodiments, the information stored via the storage module 314 may include various types of information. For example, the storage module 314 may include raw data received via the proposal wizard 312. As another example, the storage module 314 may include completed proposals generated via the proposal wizard 312. As yet another example, the storage module 314 may include biographic information regarding the users who create proposals via the proposal wizard 312. The biographic information may include information such as names, ages, email addresses, sexes, mailing addresses, employment histories, information of the type normally included in resumes, or any other information.

According to various embodiments, after proposals are created, they may be analyzed via the proposal analysis module 316. The proposal analysis module 316 may perform various operations such as matching and sequencing the proposals. For example, the proposal analysis module 316 may identify RFPs in response to which a proposal may be submitted. As another example, the proposal analysis module 316 may evaluate or rank proposals to identify the best proposals submitted in response to an RFP. As yet another example, the proposal analysis module may annotate or otherwise comment on proposals.

According to various embodiments, the annotations, comments, rankings, evaluations, and/or analysis may be provided to the user who created the proposal, the company that receives the proposal, or any other user. In this way, users may receive feedback on their proposals, which may allow them to improve their proposals or identify other potential recipients of their proposals. Alternately, or additionally, recipients of the proposals may more easily identify the best proposals for adoption or for further sorting.

According to various embodiments, analyzed or processed proposals may be transmitted to companies for further evaluation. For example, proposals may be transmitted to the human resources workbench module 318. There human resources workbench may allow the proposals to be accessed or evaluated by users such as the human resources manager 310, other users within the company that generated the RFP, or users associated with third party entities such as companies who evaluate proposals or assist in the hiring process. For instance, the human resources manager 310 may review the proposals submitted to the human resources workbench module 318 and select proposals for further analysis or processing. In the example shown in FIG. 3, the human resources manager 310 selects the proposal created by the candidate 308. Then, the candidate 308 is sent a message containing an invitation to interview with the company. The operations performed via the human resources workbench module 318 may be at least in part substantially similar to the operations performed via the management module 212 discussed with respect to FIG. 2.

According to some embodiments, the evaluation of proposals may involve identifying one or more evaluators at a company responsible for evaluating the received proposal. Identifying an evaluator may involve designating an individual, a team, a computer program, or an organizational role responsible for reading and evaluating the proposal. The proposal system may facilitate the identification of an evaluator by name, email address, employee ID, department code, or any other designator. In particular embodiments, evaluators may be identified automatically, manually, or some combination thereof When an evaluator is identified, the proposal system may facilitate notifying the evaluator, for instance transmitting a message requesting that the evaluator evaluate the proposal.

According to various embodiments, the human resources workbench 318 may provide a user interface for viewing various types of information. for example, a user such as the human resources manager 310 may view information such as the number of candidates who have responded to an RFP, a number of days remaining for responding to an RFP or proposal, a list of new proposals submitted in response to RFPs, a list of comments to RFPs, and a number of direct messages transmitted via the proposal system. In particular embodiments, messages may be transmitted between any users or organizations registered with the proposal system.

According to various embodiments, the human resources workbench module 318 may facilitate further evaluation of the candidates who created proposals via the proposal wizard 312. For instance, the human resources manager 310 may select a number of the candidates for interviewing. Then, the human resources manager 310 may select or create a number of interview questions for posing to the selected candidates. The candidates may then be interviewed in various ways. For example, the candidates may receive the interview questions via email and provide responses to the human resources workbench module 318. As another example, the candidates may be interviewed by the human resources manager 310. As yet another example, the candidates may be interviewed by another entity such as an individual associated with a third party interview service or with the applicant service provider 302. The candidates responses may be stored, for instance via the human resources workbench module 318 and/or the storage module 314. In this way, the human resources manager 310 may analyze and evaluate the responses to select the best candidate.

Figure 4:
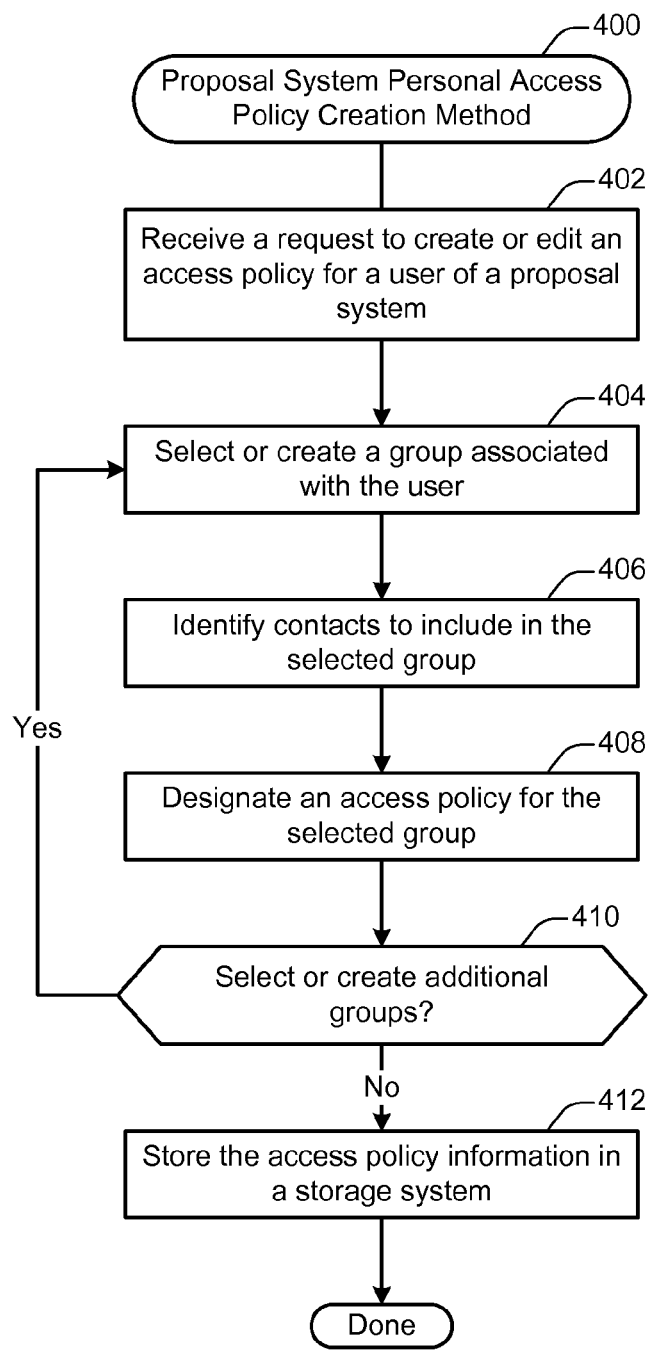
FIG. 4 illustrates an example of a method for creating a personal access policy for a proposal system in accordance with techniques and mechanisms described herein.

FIG. 4 illustrates an example of a method 400 for creating a personal access policy for a proposal system in accordance with techniques and mechanisms described herein. According to various embodiments, the method 400 may be used to create an access policy that is specific to a particular user. The user may create the personal access policy to allow the user's contacts to perform actions within the proposal system that relate to the user.

According to various embodiments, the personal access policy may facilitate the creation of granular permissions. For instance, the user may wish to grant different access rights to different groups of individuals such as the user's personal friends, close business contacts, and business acquaintances. By sorting contacts into groups and assigning access policies on a per-group basis, the user may quickly and easily establish the granular permissions.

At 402, a request to create or edit an access policy for a user of a proposal system is received. According to various embodiments, the request may be received at a server operable to provide services associated with the proposal system. For instance, the request may be received at one of the servers or other computing devices discussed with respect to FIGS. 7-10. The server may be operable to provide registration, configuration, or logins services as discussed with respect to the module 202 shown in FIG. 2.

According to various embodiments, the request may be generated automatically. For instance, a user may be invited to establish access policies as part of a registration process. Alternately, the request may be generated manually. For instance, a user may transmit a request to establish or edit the user's access policies while using the proposal system.

At 404, a group associated with the user is selected or created for associating with an access policy. According to various embodiments, a user may create any number of groups for managing the user's personal access permissions. For instance, a user may wish to create groups that correspond to divisions within the user's social circle. The user may wish to assign one set of permission to a group of personal friends, another set of permissions to a group of close professional contacts, and another set of permissions to a group of professional acquaintances.

According to various embodiments, members of different groups may be permitted to perform different types of actions with respect to proposals and RFPs created by the user. For instance, a user may wish to allow the user's professional acquaintances to recommend and comment on the user's proposals, but not to edit them. The same user may wish to allow a group of personal friends a greater level of access, such as permission to edit the user's proposals.

According to various embodiments, groups may overlap to some degree. For instance, a user may add a particular contact to a group of personal friends. The same user may also be added to a group of professional contacts. In this way, the user may be permitted to perform any action allowed by membership in either group.

According to various embodiments, groups may contain other groups. Then groups may inherit permissions from other groups. For instance, a user may designate a group of contacts as being personal friends. The user may then designate a subset of this group as being close personal friends. Then, the members of the subset may have all of the access rights granted to members of the larger group as well as additional access rights.

At 406, one or more contacts to include in the selected group are identified. According to various embodiments, the contacts may be any individuals known to the user. For example, the contacts may be other users of the proposal system, such as the user's coworkers, friends, or professional acquaintances. As another example, the contacts may be individuals who are not members of the proposal system. In such a case, the user may identify the external contacts by providing contact information such as a name, e-mail address, or account name associated with a social networking system such as Facebook, LinkedIn, or Twitter.

According to various embodiments, the contacts may be identified via various techniques or mechanisms. For example, the user may drag and drop representations of the contacts in a graphical user interface. As another example, the user may import contacts from a social networking system or e-mail system such as Google+, Gmail, Twitter, LinkedIn, or Facebook. As yet another example, the user may manually enter contact information such as an email address.

At 408, an access policy is designated for the selected group. According to various embodiments, the access policy may designate the types of actions that the members of the group are permitted to perform. Since the access policy is personal to the user, the actions permitted by the access policy may be limited to those pertaining to the user. For instance, the members of the group may be permitted to view, edit, comment on, recommend, evaluate, publish, or take some other action relating to proposals or RFPs created by the user.

According to various embodiments, the access policy may be selected when a proposal or RFP is created. For instance, a user who creates a proposal may elect to share the proposal with some groups but not with others. The user may designate the groups whose members may access a proposal when the proposal is created or at any other time. The user may designate different types of permissions for different groups.

At 410, a determination is made as to whether to select or create additional groups. As discussed with respect to operation 404, a user may create any number of groups for organizing the user's contacts. In particular embodiments, when the user is finished creating, selecting, or editing groups, the user may provide some indication within a user interface.

At 412, the access policy information is stored in a storage system. For instance, the access policy information may be stored in one of the database systems discussed with respect to FIGS. 7-9. The information may be stored in such a way that it is easily retrievable by a computing device such as an application server to quickly determine whether a requested action is permitted.

Figure 5:
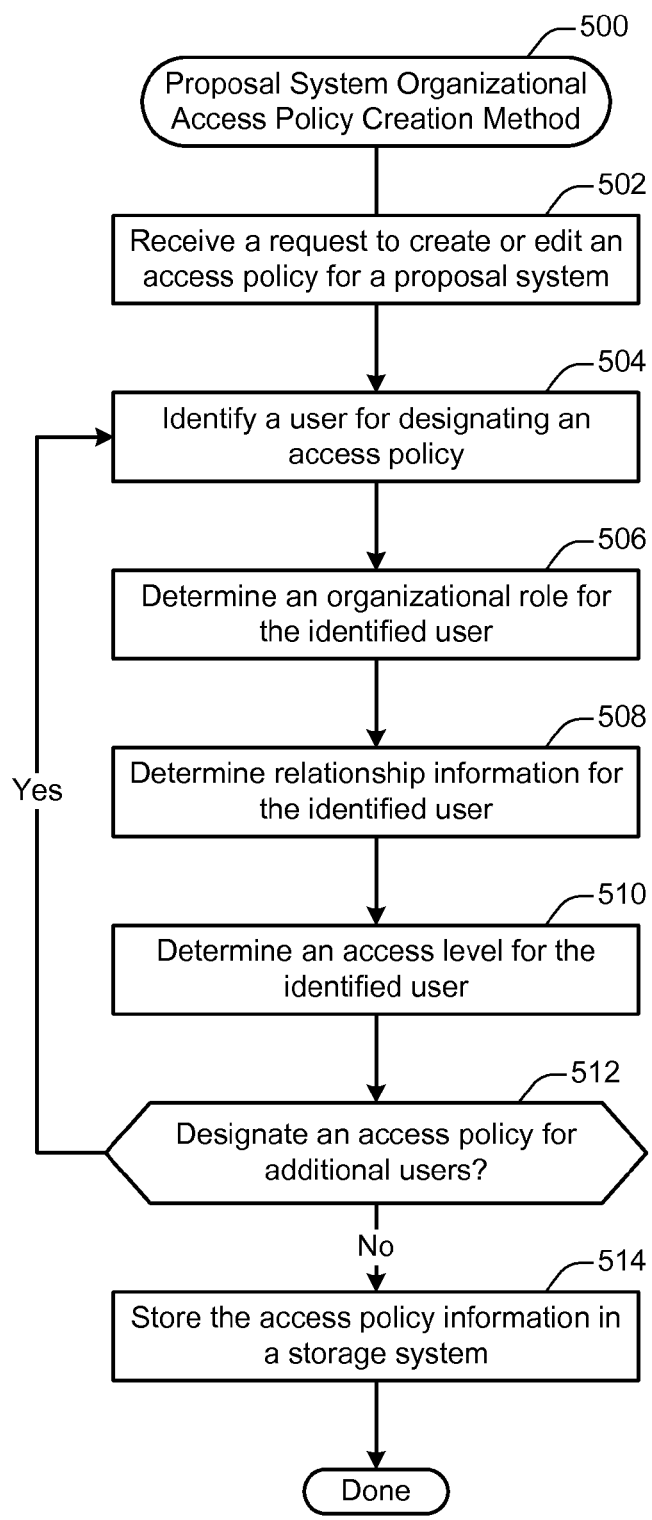
FIG. 5 illustrates an example of a method for creating an organizational access policy for a proposal system in accordance with techniques and mechanisms described herein.

FIG. 5 illustrates an example of a method 500 for creating an organizational access policy for a proposal system in accordance with techniques and mechanisms described herein. According to various embodiments, the method 500 may be used to create an access policy that is specific to an organization. The access policy may designate the actions that particular users or organizational components within the organization are permitted to perform.

According to various embodiments, the request may be generated automatically. For instance, a user configuring an organizational account may be invited to establish access policies as part of a registration process. Alternately, the request may be generated manually. For instance, a user having the appropriate access permissions may transmit a request to establish or edit the organization's access policies while using the proposal system.

At 502, a request to create or edit an access policy for a user of a proposal system is received. According to various embodiments, the request may be received at a server operable to provide services associated with the proposal system. For instance, the request may be received at one of the servers or other computing devices discussed with respect to FIGS. 7-10. The server may be operable to provide registration, configuration, or logins services as discussed with respect to the module 202 shown in FIG. 2.

At 504, a user is identified for designating an access policy. According to various embodiments, users may be identified by name, by role within the organization, by department, or by any other criteria. In particular embodiments, an organization may be associated with a single access policy or with any number of access policies. The access policy or policy may apply to any user of the proposal system or any user affiliated with the organization, including third party entities that interact with the organization. In this way, the organization can be associated with a flexible, granular access policy for efficiently managing access to proposals and RFPs associated with the organization.

At 506, an organizational role for the identified user is determined. According to various embodiments, an organizational role may indicate the types of responsibilities and duties of a user within the organization. For instance, some users may be human resources managers, while other users may be managers of other departments, while still other users may be attorneys or executives. In some cases, a user may be associated with two or more roles. In other cases, a user may not have a role recognized by the access policy.

According to various embodiments, an organizational role may be determined in various ways. For example, a role may be selected from a list or entered in a text box. As another example, a role may be determined automatically, such as by accessing a company directory. In some cases, the selection of a role may be verified by another user, such as an administrator, for security purposes.

At 508, relationship information for the identified user is determined. According to various embodiments, the relationship information may indicate one or more supervisors or subordinates with whom the user interacts. As discussed herein, the user may have permissions that are inherited from other users, such as subordinates. Also, the user may have permissions that are similar to other users who have a similar organizational role, which may be identified based on the relationship information.

At 510, an access level for the identified user is determined. According to various embodiments, the determination of the access level may be substantially similar to the operation 408 discussed with respect to FIG. 4.

According to various embodiments, an access policy may be determined at least in part automatically. For instance, a user may be provided with various types of access permissions based on an organizational role or an organizational relationship. For example, a particular organizational role, such as human resources manager, may be associated with permissions in the proposal system, such as permission to create new RFPs. As another example, access may in some instances be provided based on a hierarchical arrangement. For instance, a user's supervisor may inherit the permissions of the supervisor's subordinates.

At 512, a determination is made as to whether to create an access policy for additional users. As discussed with respect to operation 504, various types of access policies may be supported for an organization. Users may continue to be selected for designating an access policy until all relevant users are identified, until a user such as an administrator indicates that no additional users are to be selected, or until some other criteria is met.

At 514, the access policy information is stored in a storage system. For instance, the access policy information may be stored in one of the database systems discussed with respect to FIGS. 7-9. The information may be stored in such a way that it is easily retrievable by a computing device such as an application server to quickly determine whether a requested action is permitted.

Figure 6:
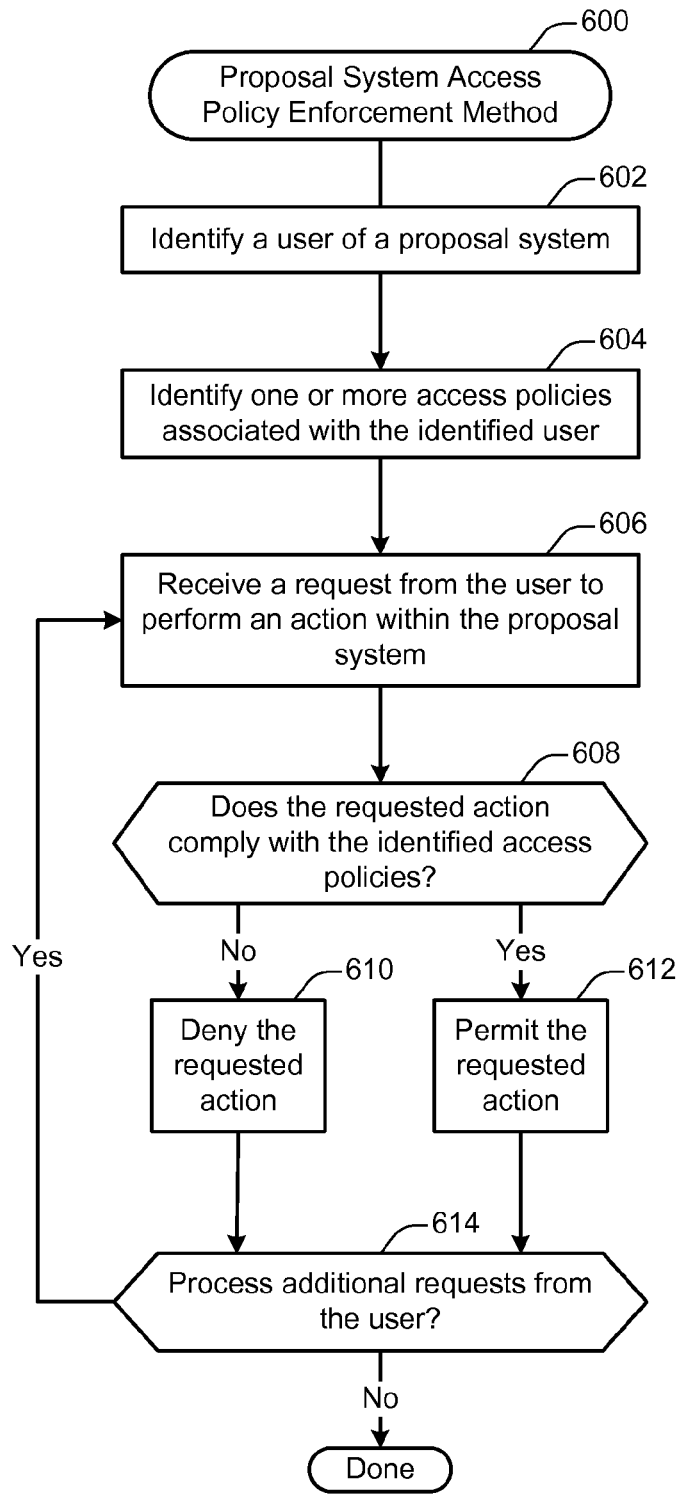
FIG. 6 illustrates an example of a method for enforcing an access policy for a proposal system in accordance with techniques and mechanisms described herein.

FIG. 6 illustrates an example of a method 600 for enforcing an access policy for a proposal system in accordance with techniques and mechanisms described herein. According to various embodiments, the method 600 may be used to ensure that only actions that are permitted under an access policy are performed. Access policies may be created as discussed with respect to FIGS. 4 and 5.

At 602, a user of a proposal system is identified. According to various embodiments, the user may be identified in various ways. For instance, the user may provide login information such as a username and password when accessing the website. The user may also be identified based on account information from other websites, such as account information stored in cookies in a web browser on a client machine.

At 604, one or more access policies associated with the identified user are identified. According to various embodiments, a user may be associated with any number of access policies. For example, the user may be associated with organizational access policies based on the user's membership in one or more organizations. As another example, the user may be designated as receiving access permissions in personal access policies associated with other users of the proposal system.

According to various embodiments, the access policies associated with the identified user may be identified in various ways. For instance, a database query including an identifier associated with the user may be executed. Alternately, or additionally, references to a number of access policies associated with the user account may be stored in association with the user account in a storage location such as a database.

At 606, a request is received from the user to perform an action within the proposal system. As discussed herein, the proposal system may support various types of operations. For instance, the user may request to access, edit, comment on, approve, recommend, or otherwise interact with data associated with a user account, a proposal, an RFP, or some other construct within the proposal system. The request may be received at a server configured to process user requests, such as a web server or application server.

At 608, a determination is made as to whether the requested action complies with the identified access policies. According to various embodiments, the determination may be made by comparing the requested action with each action policy associated with the user. If any one of the access policies permits the requested action, then the action can be permitted. For example, a user may not have permission to edit a particular RFP through a personal access policy created by the RFP's author, but the same user may have permission to edit the RFP based on an organizational access policy. In this situation, the access may be permitted.

At 610, the requested action is denied when it does not comply with the identified access policies. When an action is denied, any of various types of operations may be performed. A message may be sent to the user indicating that the requested action is not permitted. An indication of the failed request may be stored in a database or server log. A message may be sent to a user such as a system administrator or the user's supervisor. In some instances, no additional operations may be performed when a request is denied. The particular action performed may be strategically determined based on factors such as the number or frequency of failed requests, the type of action requested, or an identity of the user requesting the action.

At 612, the requested action is permitted. According to various embodiments, permitting the requested action may involve performing various types of operations. For example, a request may be forwarded to another server, such as an application server, for further processing. As another example, data such as a proposal or RFP may be retrieved from a database and transmitted to a computing device associated with the user. As yet another example, a requested change to a database or other storage location may be performed. The specific type of operation that is performed may depend at least in part upon the specific request that was received.

At 614, a determination is made as to whether to process additional requests from the user. In some instances, the request received at 606 may be received as part of an ongoing communication session or a batch of requests. In such cases, additional requests may be received. In other instances, a request may be received as a single message, in which case additional requests may not be forthcoming. Also, as discussed with respect to operation 610, some requests to perform actions not permitted by the system may trigger a timeout period in which further requests are ignored.

Figure 7:
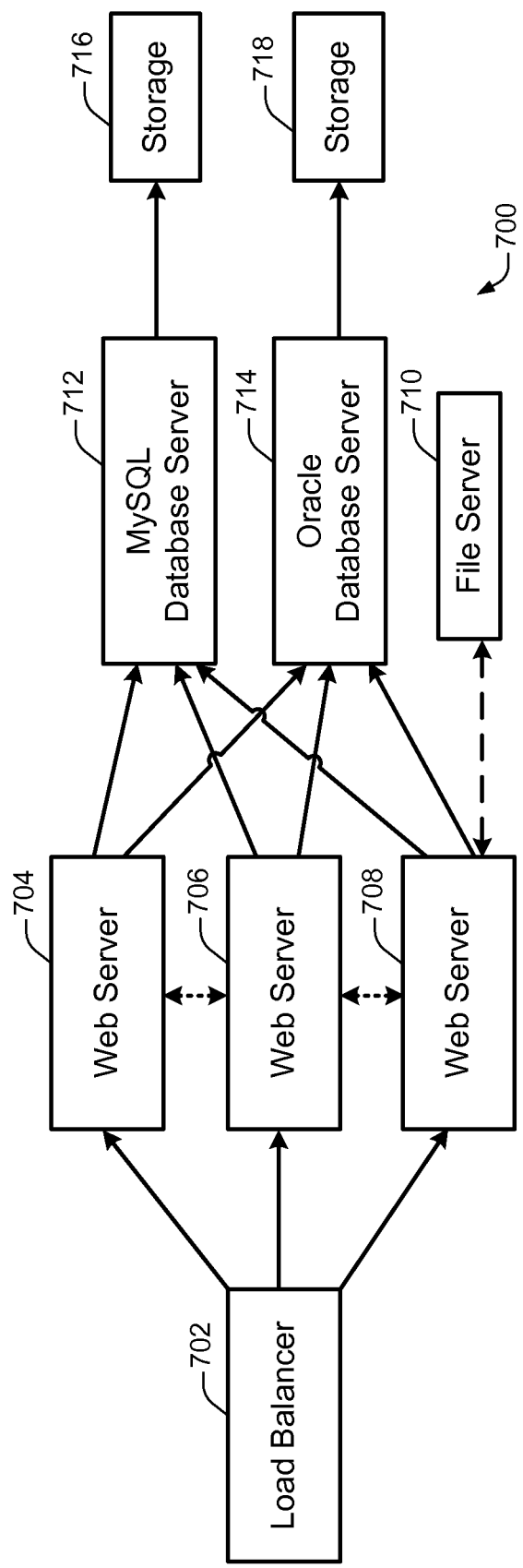
FIG. 7-10 illustrate examples systems that may be used in accordance with techniques and mechanisms described herein.

FIG. 7 shows one example of a system 700 that may be used in accordance with techniques and mechanisms described herein. The system 700 represents the conceptual architecture of at least a part of the proposal system, configured in accordance with one or more embodiments. The system 700 includes a load balancer 702, web servers 704, 706, and 708, a file server 710, a MySQL database server 712, an Oracle database server 714, and storage modules 716 and 718.

According to various embodiments, the system 700 may be operable to provide services via a network such as the Internet. For instance, the system 700 may be operable to provide the services discussed with respect to the system 200 shown in FIG. 2 and/or the system 300 shown in FIG. 3. The system 700 may be operable to facilitate operations such as registering users, logging users onto the system, generating RFPs or proposals, reviewing RFPs or proposals, analyzing or processing RFPs or proposals, and/or managing or administering the system.

According to various embodiments, the system 700 may be hosted on a cloud-computing architecture. Cloud-computing providers allow the rapid deployment and hosting of a set of web applications. Further, applications hosted in a cloud environment are readily scalable as the applications and usage grows. Employing servers configured for cloud computing may facilitate a just-in-time infrastructure in which servers and instances may be self-provisioned based on factors such as the growth and demand of the applications.

According to various embodiments, the load balancer 702 may be operable to distribute the communications and/or computing load associated with the system among several web servers. As part of this process, the load balancer may receive requests via a network such as the Internet. Then, the load balancer may select a web server for handling the request. The load balancer may select a web server based on an amount of traffic being handled by the different web servers, a number of previous requests sent to a web server, a status condition reported by a web server, or any other criteria. In particular embodiments, after the load balancer directs a request to a particular web server, the web server may establish a communication session with the requesting machine. Then, further communications may be carried out directly between the requesting machine and the web server, bypassing the load balancer 702.

The system 700 includes the web servers 704-708. According to various embodiments, each web server may be a combination of software and hardware operable to receive requests via a network and transmit responses to at least some of those requests. For instance, a web server may receive a request to display a web page, such as a web page displaying a user interface for generating an RFP or a proposal. In order to respond to the requests, the web servers may communicate with other computing devices on the network, such as application servers and database servers. The web servers may employ proprietary and/or non-proprietary web server software, such as web server software available from Microsoft or from the Apache Software Foundation. Although the system 700 shown in FIG. 7 includes three web servers, various types and numbers of web servers may be employed. The types and numbers of web servers used may be strategically determined based on factors such as the amount and type of traffic handled by the web servers.

According to various embodiments, the file server 710 may be operable to store files that may be transmitted by the web servers in response to requests received via a network. For example, the file server 710 may store relatively static web pages that may be provided to client machines relatively unchanged. These static web pages may be cached for faster delivery to users. As another example, the file server 710 may store relatively dynamic web pages that may be modified based on dynamic information, such as information retrieved from the database servers 712 and 714.

According to various embodiments, the database servers 712 and 714 may handle requests to retrieve information stored in a database or to store information in a database. In particular embodiments, different types of database servers may be used for different types of tasks. For example, the MySQL database server 712 may be used for storing dynamic data related to the user interface. As another example, the Oracle database server 714 may be used for storing business data. The types and numbers of database servers used may be strategically determined based on the type of information stored in the databases and the types of relationships between the information.

According to various embodiments, the storage modules 716 and 718 may each include one or more storage devices configured for storing data. At least some of the data stored in the storage modules may be stored in accordance with a database format associated with a database server. For instance, the storage module 716 may store information in accordance with a MySQL database format and the storage module 718 may store information in accordance with the Oracle database format.

According to various embodiments, the modules and components shown in FIG. 7 may be arranged in various ways. For example, some modules or components may be located in different physical devices that communicate via a network. As another example, some modules or components may be located in the same physical machine. As discussed herein, the system 700 is an example of a system that may be used, and systems operable to perform similar operations may include various numbers and types of modules and components.

Figure 8:
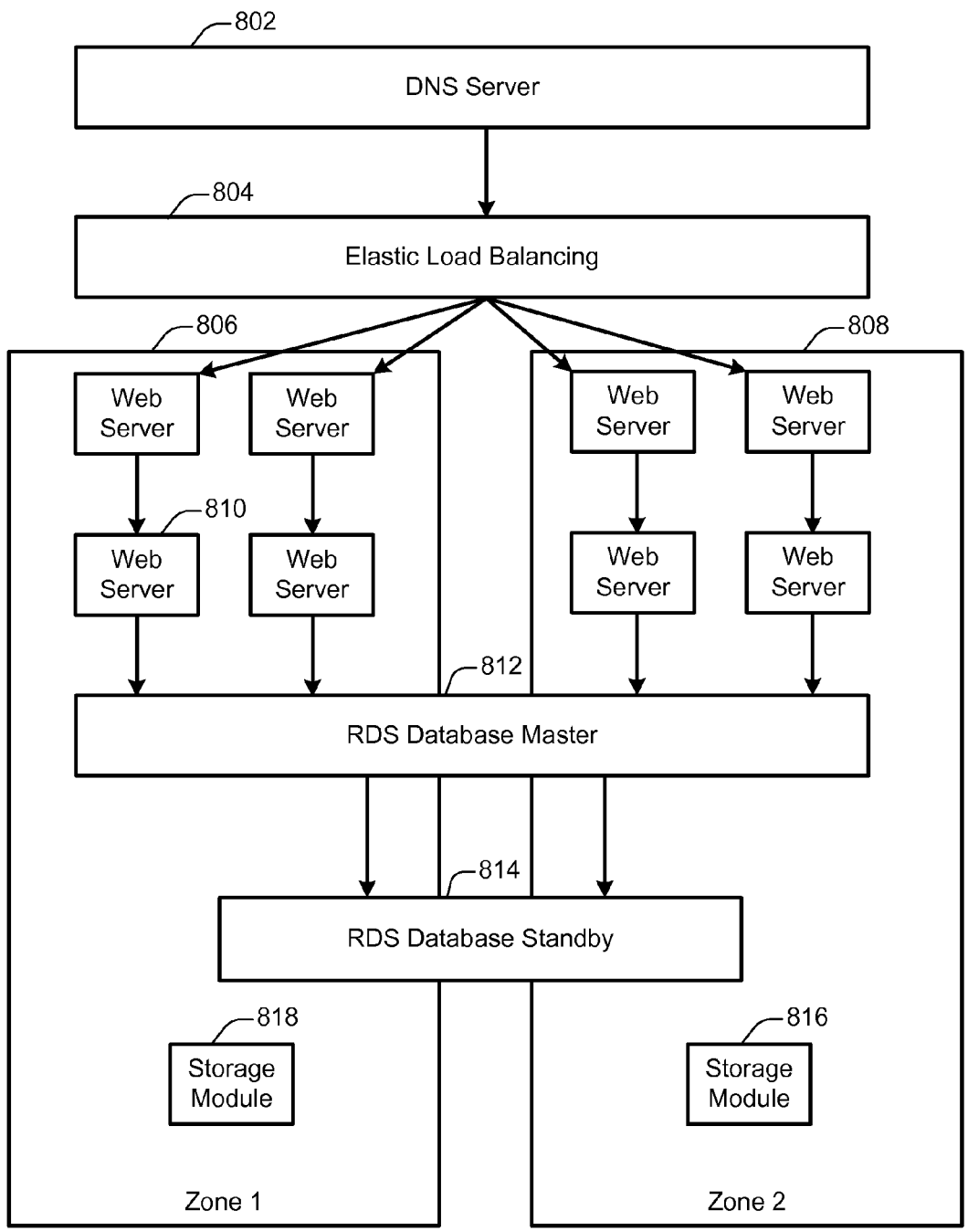

FIG. 8 shows a system 800 that may be used in accordance with techniques and mechanisms described herein. The system 800 shows a cloud-based infrastructure for providing the services related to generating RFPs and proposals. According to various embodiments, various providers of cloud-based infrastructures may be used. The system 802 includes a DNS server 802, a load balancer 804, a first group of web servers 806, a second group of web servers 808, a master database server 812, a standby database server 814, and storage modules 816 and 818.

According to various embodiments, the DNS server 802 may receive communications and identify a destination address for the communications. The load balancer 804 may select a web server for handling the traffic to help avoid or reduce network congestion. The web servers may be divided into different groups, such as groups based on geographic region, which may reduce network congestion as well as provide protection against failure at specific locations.

According to various embodiments, each web server may include a real and/or virtual server that can be configured based on various criteria, such as the computing needs of the application running on the server. Each web server may receive network communications, process the communications to prepare a response, perform any necessary communications with other servers such as application servers or database servers, and transmit the response. In some instances, some web servers may act as application servers. Application servers may serve web pages as well or may provide information to other servers for serving web pages.

According to various embodiments, the master database server 812 may organize data via a relational database, with the standby database server 814 performing backup functions. In particular embodiments, the database servers may store information in two or more types of databases. For example, MySQL databases may be used to store information such as graphical user interface (GUI) data and web analytics data, while Oracle databases may be used to store information such as business data and domain data.

According to various embodiments, the data accessed via the database servers may be stored in the storage modules 816 and 818. The storage modules 816 and 818 may provide a durable, distributed mechanism for storing host files, database files, eternal files such as PDFs and images, and any other type of files.

Figure 9:
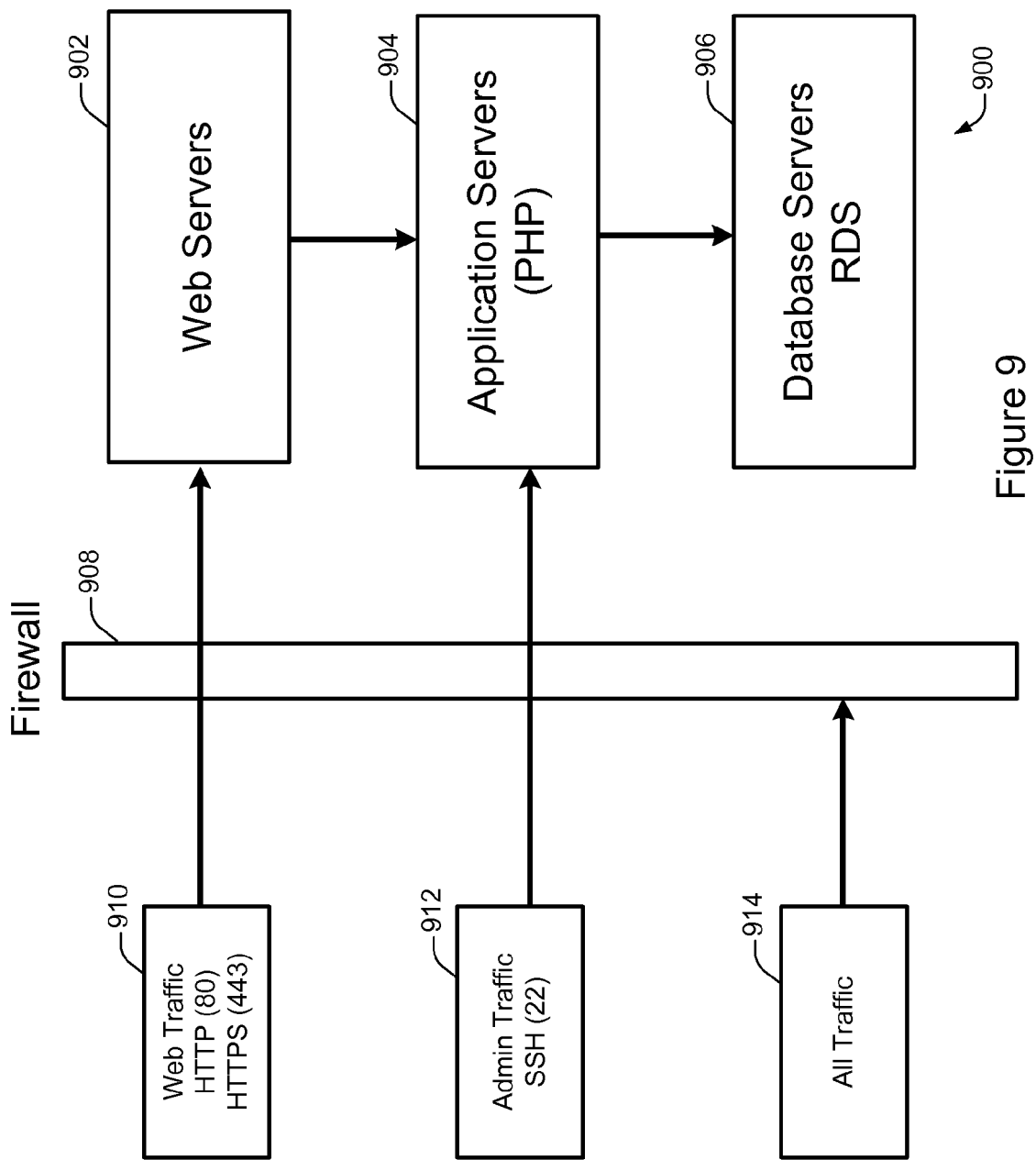

FIG. 9 shows a system 900 that may be used in accordance with techniques and mechanisms described herein. The system 900 shows the enforcement of a security protocol to protect against malicious or inadvertently dangerous network traffic. The system 900 includes one or more web servers 902, one or more application servers 904, and one or more database servers 906. Web traffic 910 and administration traffic 912 may be transmitted through a firewall 908. By routing traffic through a firewall, the servers such as web servers, application servers, and database servers may be protected.

According to various embodiments, the servers shown in FIG. 9 may be substantially similar to servers shown in other figures. For example, the web servers 902 may be substantially similar to the web servers 710 discussed with respect to FIG. 7. As another example, the database servers 906 may be substantially similar to the database servers 712 and 714. As yet another example, the application servers 904 may facilitate the type of operations discussed with respect to the systems 200 and 300 shown in FIGS. 2 and 3.

According to various embodiments, web traffic may include communications with client machines associated with users such as RFP and proposal authors. This web traffic may be transmitted via a protocol such as HTTP or HTTPS. The web traffic may be received at the web servers 902. In some instances, responses to requests transmitted via web traffic may be provided by a web server alone. For example, a request for a static web page such as a login page may in some instances be provided without accessing an application server. In some instances, providing responses to some requests may interact with an application server. For example, a request to edit an RFP based on user input may involve transmitting a message to an application server to perform the requested task. In some instances providing responses to some requests may involve transmitting a message to a database server. For example, a request to view an existing RFP may involve retrieving the RFP from a database.

According to various embodiments, administrative traffic may involve communications related to configuration, analysis, forecasting, or other administrative operations. Administrative traffic may be routed through the firewall 908 directly to the application servers 904.

According to various embodiments, the firewall 908 may include hardware and/or software. The firewall 908 may help to control incoming and/or outgoing network traffic. For example, the firewall 908 may analyze data packets and determine whether each packet should be allowed to pass through the firewall. The firewall 908 may function as a bridge between the internal network, which may be assumed to be secure and trusted, and an external network such as the internet, which is not assumed to be secure and trusted.

Figure 10:
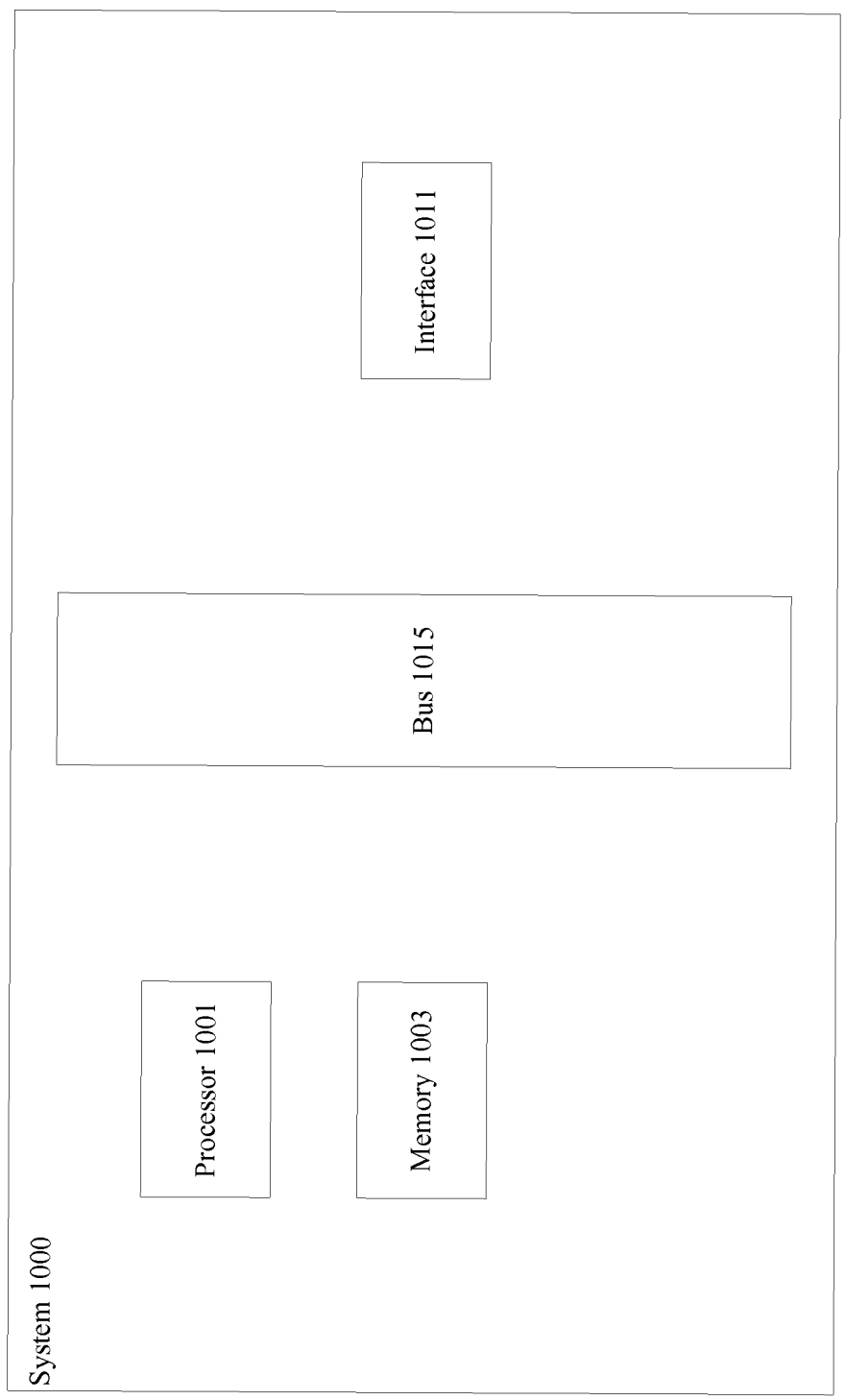

FIG. 10 illustrates one example of a server. According to particular embodiments, a system 1000 suitable for implementing particular embodiments of the present invention includes a processor 1001, a memory 1003, an interface 1011, and a bus 1015 (e.g., a PCI bus or other interconnection fabric) and operates as a streaming server. When acting under the control of appropriate software or firmware, the processor 1001 is responsible for modifying and transmitting live media data to a client. Various specially configured devices can also be used in place of a processor 1001 or in addition to processor 1001. The interface 1011 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1000 is a server that transmits and receives communications via a network such as the Internet. In particular embodiments, the system 1000 may be configured as a database server, a web server, an application server, a file server, or any other server. The system 1000 may be in communication with client machines, such as desktop computers, laptop computers, mobile devices, smart televisions, or other servers.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Computer readable media encoded with the software/program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to communicate with a particular component or device and may instead include the component or device itself. A variety of configurations are possible.

The invention claimed is:
1. A method comprising:
   receiving a message via a communications interface in a computing device, the message including a request to perform an action within a proposal system, the proposal system being operable to create a request for proposals based on user input, the request for proposals describing a business need associated with a business entity, the proposal system being further operable to process a plurality of proposal documents received in response to the request for proposals, the request being associated with a user account, wherein the plurality of proposal documents correspond to plans addressing the business need associated with the business entity;

determining, via a processor in the computing device, whether the requested action complies with an access policy, wherein the requested action comprises a request to create a designated proposal document in response to the request for proposals; and performing the requested action via the processor when it is determined that the requested action complies with the access policy, wherein performing the requested action comprises creating the designated proposal document based on user input and suggested content, the suggested content being determined by the proposal system, wherein the user account is a member of a first user account group, wherein the access policy identifies a first one or more permitted actions associated with the first user account group, and wherein determining whether the requested action complies with the access policy comprises determining whether the first one or more permitted actions includes the requested action, wherein the user account is a member of a second user account group, and wherein the access policy identifies a second one or more permitted actions associated with the second user account group, wherein determining whether the requested action complies with the access policy further comprises determining whether the second one or more permitted actions includes the requested action, and wherein the requested action is performed when either the first or second one or more permitted actions includes the requested action.

2. The method recited in claim 1, wherein the user account is associated with a first organizational role, wherein the access policy identifies one or more permitted actions for the first organizational role, and wherein determining whether the requested action complies with the access policy comprises determining whether the one or more permitted actions includes the requested action.

3. The method recited in claim 1,
wherein the requested action is an action selected from the group consisting of: publishing a proposal document, evaluating a proposal document, and transmitting a proposal document to a designated recipient.

4. The method recited in claim 1, the method further comprising:
identifying a designated organizational entity associated with the user account, wherein the proposal system is operable to provide proposal management services to a plurality of organizational entities including the designated organizational entity; and
retrieving the access policy, the access policy being associated with the designated organizational entity.

5. The method recited in claim 1,
wherein the request for an action is generated automatically.

6. The method recited in claim 1,
wherein at least one of the first one or more permitted actions associated with the first user account group is different from each of the one or more permitted actions associated with the second user account group.

7. The method recited in claim 1,
wherein the user account is associated with a first organizational role, wherein the access policy identifies one or more permitted actions for the first organizational role, and wherein determining whether the requested action complies with the access policy comprises determining whether the one or more permitted actions includes the requested action.

8. The method recited in claim 7,
wherein the first organizational role is associated with relationship information, wherein the relationship information designates a relationship between the first organizational role and a second organizational role, and wherein a designated one of the one or more permitted actions is inherited from access policy information associated with the second organizational role.

9. A computing system comprising:
a communications interface operable to receive a message, the message including a request to perform an action within a proposal system implemented in the computing system, the proposal system being operable to create a request for proposals based on user input, the request for proposals describing a business need associated with a business entity, the proposal system being further operable to process a plurality of proposal documents received in response to the request for proposals, the request being associated with a user account, wherein the plurality of proposal documents correspond to plans addressing the business need associated with the business entity;

memory operable to store the received message; and
a processor operable to:
determine whether the requested action complies with an access policy, wherein the requested action comprises a request to create a designated proposal document in response to the request for proposals, and
perform the requested action when it is determined that the requested action complies with the access policy, wherein performing the requested action comprises creating the designated proposal document based on user input and suggested content, the suggested content being determined by the proposal system,
wherein the user account is a member of a first user account group, wherein the access policy identifies a first one or more permitted actions associated with the first user account group, and wherein determining whether the requested action complies with the access policy comprises determining whether the first one or more permitted actions includes the requested action,
wherein the user account is a member of a second user account group, and wherein the access policy identifies a second one or more permitted actions associated with the second user account group, wherein determining whether the requested action complies with the access policy further comprises determining whether the second one or more permitted actions includes the requested action, and wherein the requested action is performed when either the first or second one or more permitted actions includes the requested action.

10. The system recited in claim 9, wherein creating the designated proposal document comprises processing the user input and suggested content to arrange the proposal document on a single page.

11. The system recited in claim 9,
wherein the requested action is an action selected from the group consisting of: publishing a proposal document, evaluating a proposal document, and transmitting a proposal document to a designated recipient.

12. The system recited in claim 9,
identifying a designated organizational entity associated with the user account, wherein the proposal system is operable to provide proposal management services to a plurality of organizational entities including the designated organizational entity; and
retrieving the access policy, the access policy being associated with the designated organizational entity.

13. The system recited in claim 9,
wherein the request for an action is generated automatically.

14. The system recited in claim 9,
wherein the user account is associated with a first organizational role, wherein the access policy identifies one or more permitted actions for the first organizational role, and wherein determining whether the requested action complies with the access policy comprises determining whether the one or more permitted actions includes the requested action.

15. One or more non-transitory computer readable media having instructions stored thereon for performing a method, the method comprising:
receiving a message via a communications interface, the message including a request to perform an action within a proposal system, the proposal system being operable to create a request for proposals based on user input, the request for proposals describing a business need associated with a business entity, the proposal system being further operable to process a plurality of proposal documents received in response to the request for proposals, the request being associated with a user account, wherein the plurality of proposal documents correspond to plans addressing the business need associated with the business entity;
determining, via a processor, whether the requested action complies with an access policy, wherein the requested action comprises a request to create a designated proposal document in response to the request for proposals; and
performing the requested action when it is determined that the requested action complies with the access policy, wherein performing the requested action comprises creating the designated proposal document based on user input and suggested content, the suggested content being determined by the proposal system,
wherein the user account is a member of a first user account group, wherein the access policy identifies a first one or more permitted actions associated with the first user account group, and wherein determining whether the requested action complies with the access policy comprises determining whether the first one or more permitted actions includes the requested action,
wherein the user account is a member of a second user account group, and wherein the access policy identifies a second one or more permitted actions associated with the second user account group, wherein determining whether the requested action complies with the access policy further comprises determining whether the second one or more permitted actions includes the requested action, and wherein the requested action is performed when either the first or second one or more permitted actions includes the requested action.

16. The one or more computer readable media recited in claim 15, wherein creating the designated proposal document comprises processing the user input and suggested content to arrange the proposal document on a single page.

17. The one or more computer readable media recited in claim 15,
wherein the requested action is an action selected from the group consisting of: publishing a proposal document, evaluating a proposal document, and transmitting a proposal document to a designated recipient.

* * * * *